H. L. BOYER.
APPARATUS FOR FORMING STORAGE BATTERY SEPARATORS.
APPLICATION FILED MAY 5, 1917.
1,297,644.
Patented Mar. 18, 1919.
2 SHEETS—SHEET 2.
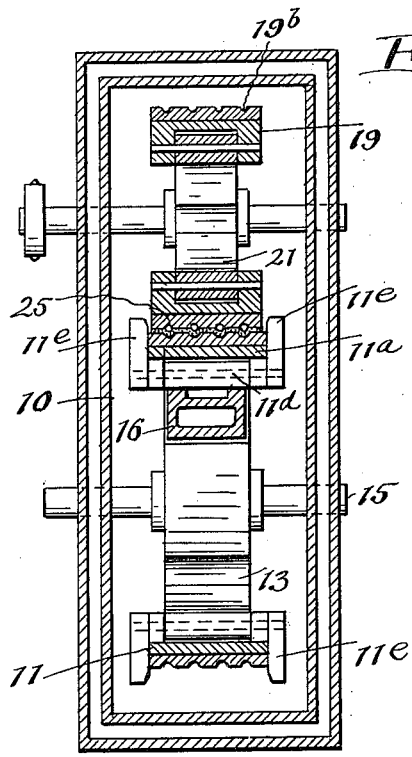
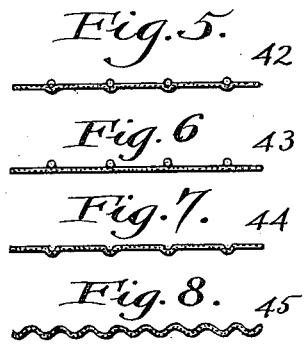
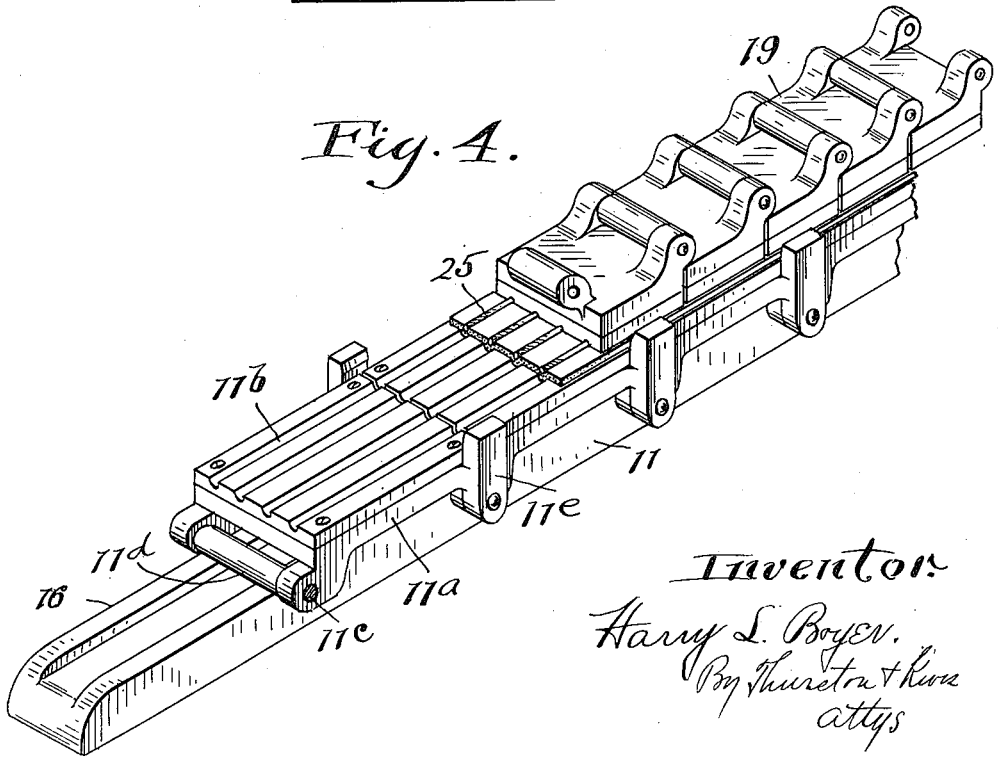

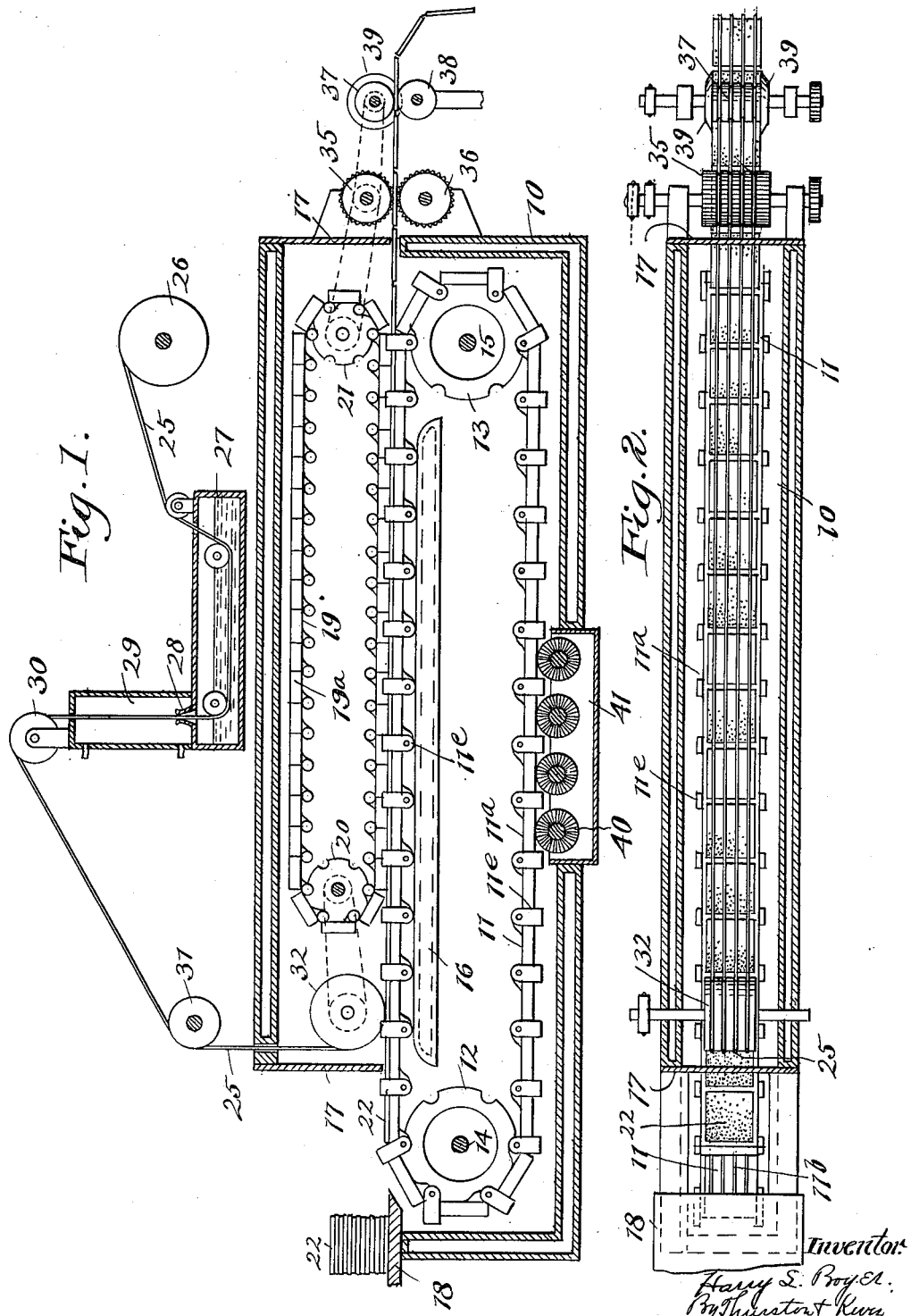

UNITED STATES PATENT OFFICE.

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

APPARATUS FOR FORMING STORAGE-BATTERY SEPARATORS.

1,297,644. Specification of Letters Patent. Patented Mar. 18, 1919.

Application filed May 5, 1917. Serial No. 166,727.

*To all whom it may concern:*

Be it known that I, HARRY L. BOYER, a citizen of the United States, residing at Trenton, in the county of Mercer and State of New Jersey, have invented a certain new and useful Improvement in Apparatus for Forming Storage-Battery Separators, of which the following is a full, clear, and exact description.

This invention relates to apparatus for forming storage battery separators and has for its object the provision of an apparatus by which separators are ribbed and vulcanized efficiently and in a continuous manner. A further object is to provide an apparatus by which separators are produced having greater life and greater mechanical strength than the separators generally employed prior to this invention.

The present invention comprises a vulcanizing chamber provided with two opposing endless chains of connected blocks which receive between them the separator plates which are adapted to be supplied continuously to the vulcanizer and which convey the plates through the vulcanizer and also form the ribs in the same. The ribs may be formed in the plates solely by the molding action of the blocks of the two chains, in which event the faces of the blocks will be suitably grooved and ribbed, or the ribs may be formed wholly or partially by rib forming material which is pressed onto or into the plates by the blocks of the chains. Preferably, however, the ribs are formed on both sides of each separator by rib forming material in the form of rubber coated fibrous cords which are fed continuously to the vulcanizing chamber in parallel rows simultaneously with the feeding of the plates, and are attached to one side of the plates before they pass between the opposing blocks of the two traveling chains, and then when the plates with the cords attached thereto pass between the blocks, the latter which will be siutably grooved, press the cords into the plates and thus press downwardly the plates opposite the cords so as to produce ribs on both sides, the ribs on one side being formed by the protruding portions of the cords, and the ribs on the opposite side being formed by the portions of the plates which have been displaced or pressed outward by the cords or by the partial embedding of the cords in the plates.

The invention may be further briefly summarized as consisting in certain novel details of construction and combinations and arrangements of parts which will be described in the specification and set forth in the appended claims.

In the accompanying sheets of drawings, Figure 1 is a longitudinal vertical sectional view through the apparatus; Fig. 2 is a horizontal sectional view, this section being taken between the endless chains; Fig. 3 is a transverse sectional view; Fig. 4 is a perspective view showing portions of the two rib forming and conveying chains, and showing how the cords are pressed into the plates to form the ribs; and Figs. 5, 6, 7 and 8 are sectional views through different types of separators which may be formed by slightly modified forms of the apparatus.

The apparatus formed in accordance with the present invention includes a vulcanizing chamber 10 which may be heated in any suitable manner, but is preferably steam heated, the walls of the chamber in this case being hollow for the circulation of steam. Supported in the central lower part of the chamber is an endless chain 11 composed of a series of pivotally connected conveying and rib forming blocks $11^a$, having removable outer faces preferably provided with longitudinal grooves $11^b$, the number of which will depend on the number of ribs which are to be provided on the finished separator. These blocks $11^a$ are connected together by bolts $11^c$ which are surrounded by rollers $11^d$. This chain travels about two sprocket wheels 12 and 13 supported on transverse shafts 14 and 15, the former of which may serve as a driving shaft, these sprocket wheels 12 and 13 being provided with peripheral notches which are engaged by the rollers $11^d$ to form the driving engagement between the sprockets and the chain.

Extending longitudinally of the chamber, beneath the upper portion of the chain 11 are horizontal rails 16 which are engaged by the rollers $11^d$ so that the blocks of the chain in their passage through the major portion of the length of the chamber will travel in a straight line and in substantially rigid formation. These rails 16 are preferably on the upper surface of a hollow heated chamber from which heat radiates to assist in the vulcanization of the separators.

The upper part of the chamber above the chain 11 is somewhat shorter than the remainder, this portion being closed at its ends by flexible flaps 17 which permit the ingress and egress of the plates, but at the same time do not allow much heat to escape. It should be observed that at the left end of the machine, as shown in Fig. 1, a portion of the chain 11 is open or exposed, this portion being just above the sprocket 12, and being adjacent the receiving table 18 upon which separator plates may be stacked so that they may be fed on the upper faces of the blocks as they pass around the sprocket 12 and assume a horizontal position.

In the upper part of the chamber is a second endless chain 19 which is driven at the same speed as the lower chain, the chain 19 being composed of blocks 19$^a$ which are pivotally connected together in the same manner as the blocks 11$^a$, but are preferably shorter than the latter so that smaller sprocket wheels 20 and 21 may be employed, these sprocket wheels being mounted on transverse shafts, one of which may be utilized as a drive shaft. The chain 19$^a$ coöperates with the chain 11 to rib the separator plates, and to that end the lower section of the chain 19 is just above the upper section of the lower chain 11. The outer faces of the blocks 19$^a$, which faces are removable and interchangeable, are preferably provided with longitudinal grooves 19$^b$ which in forming the preferred form of separator are equal in number to, and register with the grooves of the contiguous blocks of the lower chain as the blocks of the two chains travel in unison from left to right through the chamber.

As the opposing faces of the blocks of the two chains receive between them the separator plates and also preferably the rib forming material, as for example in forming the preferred type of separator, and as the grooves of the upper and lower blocks in such case coöperate to form the ribs in the plates, it is essential that the blocks be held in absolute registration, and therefore one set of blocks is provided with a suitable form of centering means, which in this case consists of lugs 11$^e$ which project outwardly from the blocks 11 and receive between them and center the blocks of the upper chain in the manner clearly shown in Figs. 1, 3 and 4.

While an automatic feed of the separator plates can be provided if desired, as here shown, the plates which are formed wholly or partially of rubber, and a stack of which are shown at 22 on the receiving table 18, will be placed by hand on the blocks 11$^a$ as they come up around the sprocket 12, so that the plates will be conveyed inwardly to a point where the rib forming material (employed in making the preferred type of separator) is pressed onto the same, as will next be described, and then between the blocks of the two chains which actually form the ribs.

Although with my invention in its broad aspects separators may be formed with ribs or other uneven surfaces without requiring the use of separate rib forming material, as for example, when the ribs are formed solely by the molding action of the blocks, nevertheless, and as before stated, the preferred type of separator which is produced with this apparatus is ribbed in part with rib forming material which is supplied to the vulcanizing chamber simultaneously with the separator plates. I will first describe the apparatus which is utilized in forming this preferred type of separator and will subsequently explain in what manner the other types may be made and what features of the invention are utilized in so doing.

For the rib forming material I prefer to employ, as before stated, rubber coated or covered fibrous cords. A series of cords 25, the number of which will depend upon the number of ribs to be formed in the plates, is supplied from one or a series of reels 26, and they pass in parallel rows through a tank 27 containing rubber cement or rubber dissolved in a suitable solvent so that they become thoroughly covered or coated with unvulcanized rubber. Then the cords pass through dies 28 which wipe off the excess rubber, then through a drying chamber 29, then over a grooved drum 30 at the top of the chamber 29, then downwardly and forwardly over a similar grooved drum 31, and finally they pass downwardly into the vulcanizing chamber to and around a grooved drum 32 having peripheral grooves which are spaced precisely in accordance with the desired spacing of the ribs of the separators. This drum 32 is in front of the upper chain 19 and sufficiently close to the blocks of the lower chain 11 which are traveling along the horizontal supporting rails 16, that the rubber covered cords 25 are pressed by the drum down onto and are thus attached to the separator plates 22 as the latter are conveyed by the blocks under the drum 32. Shortly after the plates with the cords sticking thereto, pass the drum 32, they pass under the blocks 19$^a$ of the upper chain, and in so doing the cords enter the grooves of the blocks 19$^a$, which grooves are only about half the depth of the cords. The blocks 19$^a$ which pass along with, and at precisely the same speed as the blocks 11$^a$ are sufficiently heavy to press the cords down into the separator plates and to press the portions of the latter beneath the cords down into the grooves of the blocks 11$^a$, thus forming ribs on both sides of the plates, as clearly shown in Fig. 5.

As the plates with the cords pressed into the same in the manner just explained, pass along the vulcanizing chamber, the plates are thoroughly vulcanized and the cords are also thoroughly vulcanized to the plates so that when the plates finally pass from the chamber they are hard, and the cords are firmly knitted thereto. The length of the chamber and the speed of operation of the chains are such that the plates and cords are thoroughly vulcanized and vulcanized together when they emerge from the chamber.

The vulcanized separators pass from the chamber in a series connected together by the cords which must be cut apart to separate the separators. This severing of the cords can be done right at the machine as the separators pass therefrom, or at any subsequent time.

The separators have a tendency to stick into the grooves of the chain blocks and I therefore provide at the outlet end of the chamber stripper rolls 35 and 36 between which separators pass and which forcibly pull the separators away from the blocks. Beyond the stripper rolls I provide trimming rolls 37 and 38, between which the separators pass, at least one of these rolls having cutting blades 39, which trim off the sides of the separators. The stripping rolls may be geared together so as to rotate at the same speed but in opposite directions, and the same is true of the trimming rolls.

To produce the best results it is desirable that the blocks, particularly the blocks of the lower chain be cleaned of foreign matter and particles of rubber, and I therefore provide at any suitable point along the bottom of the chamber, cleaning brushes 40 which wipe off the lower faces of the blocks 11ª. These brushes as here shown, are journaled in a chamber 41, which may be provided with a soapy solution.

With this apparatus, very efficient separators are produced as they have very long life and mechanical strength, the particular ribbing material which I employ increasing considerably the strength of the separators. Furthermore the ribs are not fragile as are ribs formed of rubber. Furthermore with this apparatus the separators are ribbed uniformly and at a rapid rate as the operation is carried on continuously.

The capacity of the machine can be made anything desired by increasing the size or width of the blocks so that each block will accommodate a plurality of separators. As here shown, each block 11ª receives but a single separator, but if desired, it may be widened so as to accommodate two or more than two separators. In the latter event it is only necessary to widen the entire apparatus including the chamber and both chains and to supply to the vulcanizer in parallel rows a larger number of rubber covered cords.

As before stated, the separator formed with the apparatus described above, is shown at 42 in Fig. 5, but as also previously stated, other types of separators can be produced which may or may not require the use of the rib forming rubber covered cords. In Fig. 6 there is shown at 43 in cross section a separator wherein the ribs are formed on one side only by the rubber covered cords. In making this separator the faces of the blocks of the upper chain will be grooved substantially as in making the separator of Fig. 5, but the grooves will be somewhat deeper than in making the latter. The upper blocks will press the cords down against the separator plates and also press the latter down on the flat faces of the lower block continuously during the vulcanizing operation or while the plates are being conveyed toward the outlet end of the vulcanizer.

In Figs. 7 and 8 I have shown separators 44 and 45, the ribs of which are molded from the separator plates by the coöperating action of the blocks of the two chains, separate rib forming material not being required. In forming separators of these types the apparatus shown in the upper part of Fig. 1 for rubberizing and supplying the rubber coated cords will not be employed. To form the separator 44 of Fig. 7 the blocks of the lower chain will be provided with grooves as in the first instance, and the blocks of the upper chain will be provided with ribs which register with the grooves so as to force the separator plates down into the grooves of the lower blocks and thus mold the ribs in the plates. To form the separator 45 shown in Fig. 8, the blocks of the upper and lower chains will be provided with grooves and ribs so that by the molding action of the blocks the separator with ribs provided on both sides, or of the corrugated type is produced.

The faces of the blocks are made removable for the purpose of permitting these various types of separators to be formed, as well as to permit replacement in case the faces of the blocks become broken or worn from use.

From the above it will be obvious that certain changes may be made in the details of the machine, as for example, to permit the production of various types of separators, without departing from the principle of the invention and without affecting the operation of some of the main features thereof. Furthermore, other changes may be made in details of construction or form and arrangements of parts, and I therefore aim in my claims to cover all modifications which do not involve a departure from the spirit and scope of my invention in its broadest aspects.

Having thus described my invention, what I claim is:

1. In an apparatus for ribbing storage battery separators, an endless conveyer on which separator plates are adapted to be placed, means for applying rib forming material to said plates, and means moving with said conveyer for pressing the rib material onto said plates.

2. In an apparatus for ribbing storage battery separators, an endless conveyer on which separator plates are adapted to be placed, means for applying rib forming material to said plates while on the conveyer, and means for embedding the rib material in the plates.

3. In an apparatus for ribbing storage battery separators, an endless conveyer on which separator plates are adapted to be placed, means for applying rib forming material to said plates on the conveyer, and means traveling with the conveyer for pressing the rib material into the plates.

4. In an apparatus for ribbing storage battery separator plates, an endless conveyer of grooved blocks on which separator plates are adapted to be placed, means for supplying continuous strands of rib material to the plates, and an endless chain of grooved blocks having a portion adjacent the conveying portion of the conveyer for pressing the rib material into the plates and for pressing the latter into the grooves of the conveyer blocks.

5. In an apparatus for ribbing storage battery separator plates, an endless conveyer of grooved blocks on which separator plates are adapted to be placed, means for supplying continuous strands of rib material to the plates, an endless chain of grooved blocks having a portion adjacent the conveying portion of the conveyer for pressing the rib material into the plates and for pressing the latter into the grooves of the conveyer blocks, and means for stripping the ribbed plate from the blocks.

6. In an apparatus for vulcanizing and ribbing storage battery separator plates, a vulcanizing chamber, an endless conveyer of grooved blocks on which separator plates are adapted to be placed, means for supplying continuous strands of rib material to the plates, an endless chain of grooved blocks having a portion adjacent the conveying portion of the conveyer for pressing the rib material into the plates and for pressing the latter into the grooves of the conveyer blocks, and stripper rolls adjacent the discharge end of the chamber.

7. In an apparatus for vulcanizing and ribbing storage battery separators, a vulcanizing chamber, an endless conveyer in the chamber composed of grooved blocks on which separator plates are adapted to be placed, means for supplying continuous strands of rib material to the plates on the conveyer, an endless chain of grooved blocks having a portion adjacent the conveying portion of the conveyer for pressing the rib material into the plates and for pressing the latter into the grooves of the conveyer blocks, and means for cleaning the blocks of the conveyer.

8. In an apparatus for vulcanizing and ribbing storage battery separators, a vulcanizing chamber, an endless conveyer in the chamber and adapted to receive separator plates, means for applying rib forming material to said plates on the conveyer, means moving with said conveyer for pressing the rib material onto said plates, and means adjacent the discharge end of the conveyer for trimming the sides of the plates.

In testimony whereof, I hereunto affix my signature.

HARRY L. BOYER.